June 7, 1955  H. T. HUNTER ET AL  2,709,974
TRAY LOADING APPARATUS
Filed June 21, 1951  3 Sheets-Sheet 3
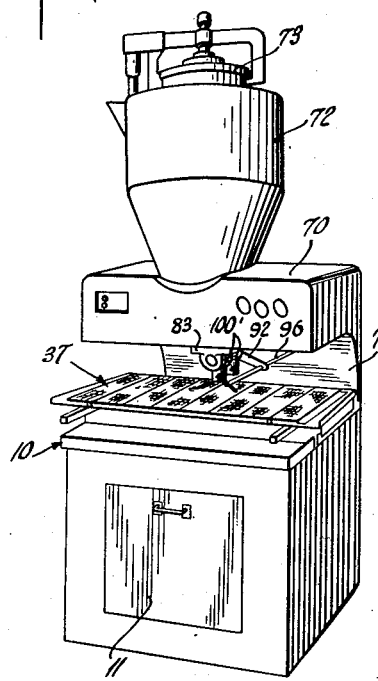
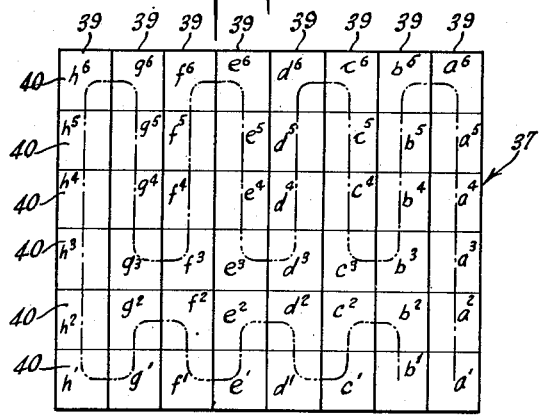
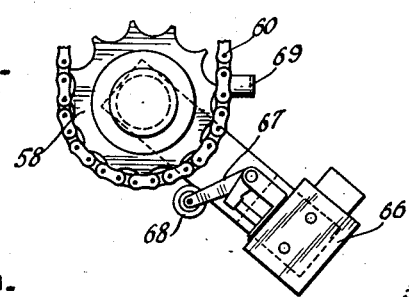
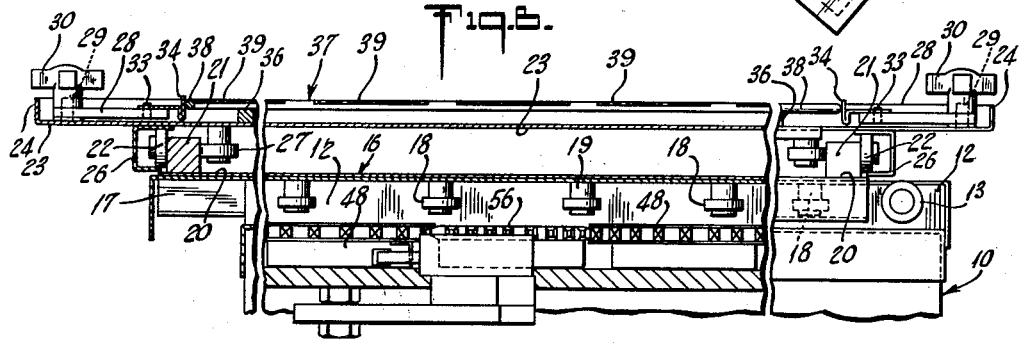
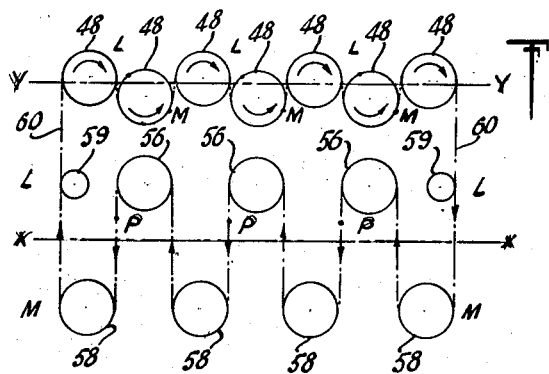
INVENTORS
HERBERT T. HUNTER and
BEN W. WILSON
BY
ATTORNEY.

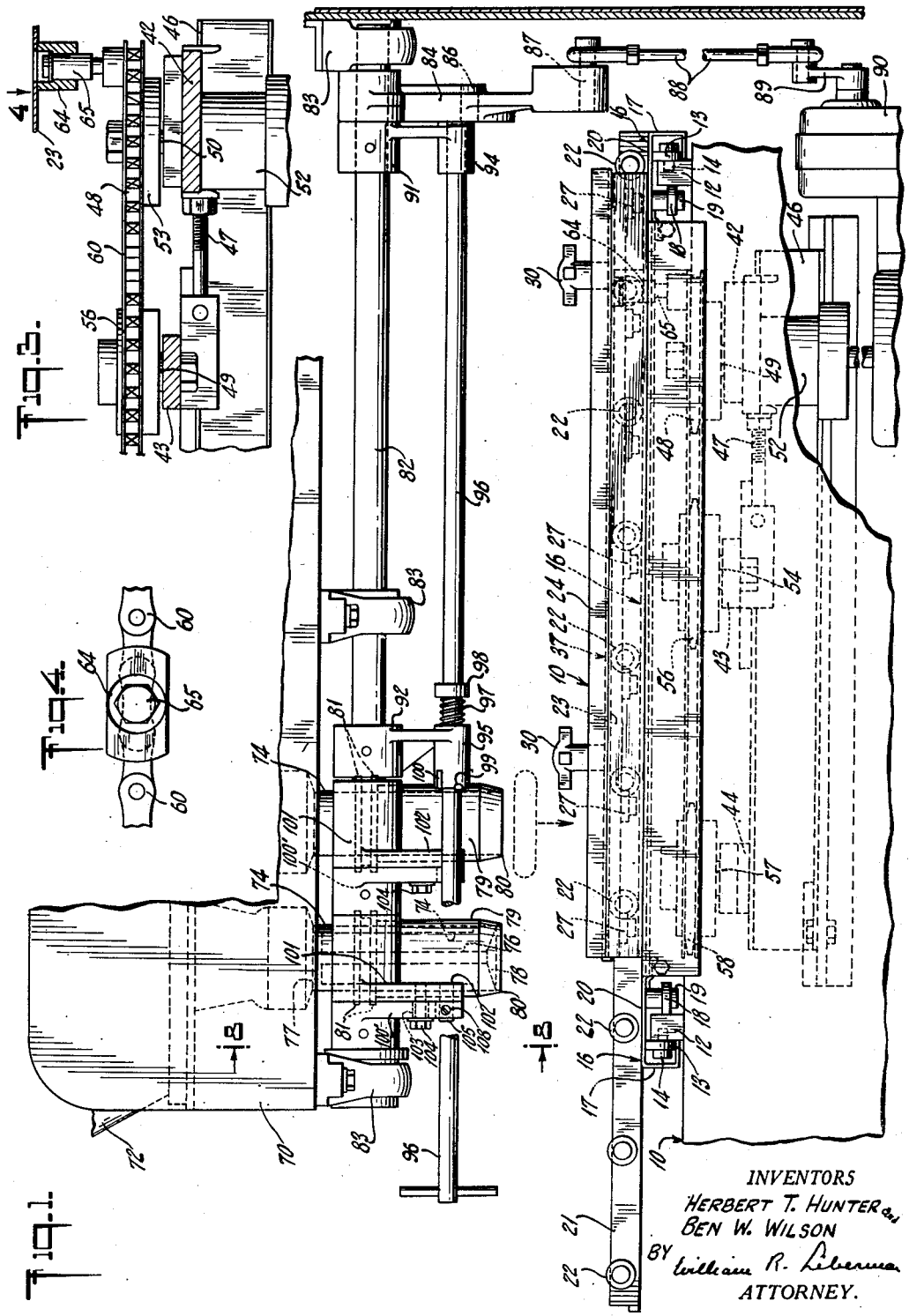

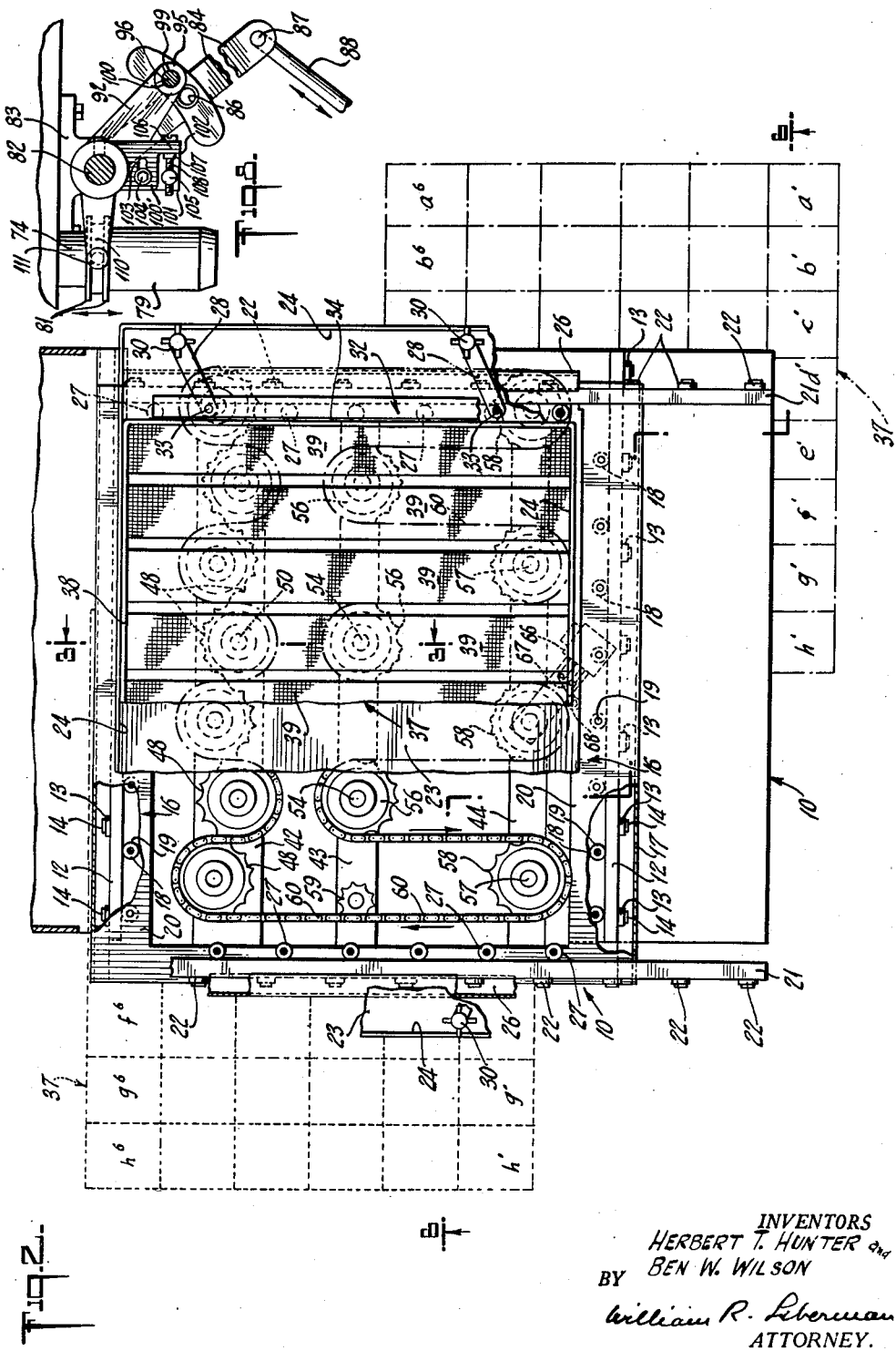

United States Patent Office 2,709,974
Patented June 7, 1955

2,709,974

TRAY LOADING APPARATUS

Herbert T. Hunter, Catonsville, Md., and Ben W. Wilson, Manhasset, N. Y., assignors to Doughnut Corporation of America, New York, N. Y., a corporation of New York Application June 21, 1951, Serial No. 232,790

14 Claims. (Cl. 107—7)

The present invention relates generally to bakery apparatus, and in particular it relates to the type of apparatus used for loading raw dough shapes onto a suitable support for subsequent operations. More particularly, the present invention relates to an apparatus including a dough cutter and a support which is automatically movable or shiftable beneath the cutter to receive raw dough shapes in a predetermined pattern.

In the formation of ordinary doughnuts, or other fried cakes, the raw dough shapes are dropped from the cutter directly into the frying liquid or chamber. However, when yeasted dough is used, it is highly desirable to proof the dough after its shaped formation and prior to the frying or baking thereof. The bakery field is replete with apparatuses which include cutters, proofers and heat treating devices, and the industry well knows devices wherein trays are mounted on endless belts and are moved into registry with the cutters or other forming machines to receive raw dough shapes thereon to move them thereafter into and through a proofer, and thence into a frying or baking chamber. All of these conventional devices, however, are necessarily large, cumbersome and expensive and their use is denied a small operator, one who has limited space, help, or funds, etc. at his disposal. In the past, in the formation of yeasted dough shapes as doughnuts or the like, the operator would cut the shapes by hand on a large board on which the sheet of dough would be rolled. The dough shapes would be removed from the board by hand and thereafter placed by hand on trays or screens which would then be loaded into a proofing chamber. It is this particular aspect of the bakery field to which the present invention is directed, and the main object thereof is the provision of a new apparatus for and method of loading a tray or screen with a plurality of raw dough shapes.

Another object of the present invention is the provision of an apparatus including a dough hopper and cutter mounted on a suitable support, in combination with a tray or screen carrier mounted on the support and adapted to shift through a tortuous path in timed relation to the operation of the cutter as to receive thereon, in properly spaced relation, a plurality of raw dough shapes.

Another object of the present invention is the provision of a support tray or screen for receiving raw dough shapes which is automatically shiftable in timed relation to the operation of a dough cutter so as to receive thereon, in properly spaced position, a plurality of raw dough forms distributed evenly over the entire surface of the tray or screen.

Still another object of the present invention is to provide an apparatus for shifting a tray or screen support through a tortuous path in timed and spaced relation to the operation of a dough cutter, whereby the tray or screen is successively so disposed beneath the cutter as to receive ultimately a load of raw dough shapes evenly distributed over its surface.

The above and further objects of the present invention will become apparent from the reading of the following description taken in conjunction with the accompanying drawings, wherein:

Figure 1 is a side elevational view of the improved machine, shown partly broken away and partly in section, for convenience of illustration;

Figure 2 is a top plan view, partially broken away, of a portion of said machine, illustrating the tray conveying mechanism and a supported tray, with parts broken away for convenience of illustration;

Figure 3 is a sectional view along line 3—3 of Figure 2;

Figure 4 is a fragmentary detail view of Figure 3 in the direction of the arrow 4 in Figure 3;

Figure 5 is a perspective view of the improved machine;

Figure 6 is a sectional view taken along line 6—6 of Figure 2;

Figure 7 is a detail view of a cycle control mechanism;

Figure 8 is a fragmentary, sectional view taken along line 8—8 of Figure 1, with parts broken away for convenience of illustration;

Figure 9 is a schematic, sectional view of a tray, illustrating the sequence of article-deposit upon said tray; and Figure 10 is a view similar to Figure 2, illustrating schematically the tray advancing mechanism.

The present invention broadly contemplates the provision of a loading apparatus comprising means for conveying a tray in a closed predetermined, substantially planar path, and means for depositing articles upon said tray in timed relationship with the movement of said tray along said path, whereby said articles are deposited upon said tray in a predetermined pattern.

In accordance with a preferred embodiment of the present invention, there is provided a first pair of transversely spaced longitudinally extending tracks upon which is slidably mounted along said tracks a second pair of longitudinally spaced transversely extending tracks. A tray or screen supporting platform is mounted on and transversely slidable along said second pair of tracks whereby said platform is universally movable or translatable in a horizontable plane while being maintained in a constant orientation with its axis, parallel to the corresponding pairs of tracks. A mechanism for conveying the tray in a predetermined tortuous path including two transversely spaced sets of longitudinally spaced transversely offset similar sprockets, the transverse offsets of one of said sets being greater than the offsets of the other of said sets. A sprocket chain, defining an endless conveyor, engages the sprockets transversing an undulating path about the outside opposite faces of the first set of sprockets, to the second set of sprockets and then to the first set of sprockets. At least one of the sprockets is positively driven and the sprocket chain is provided with means which engage the tray supporting platform at substantially its rear mid-point and convey it along a path corresponding to that of the sprocket chain. The distance between corresponding points of the undulating path about the second set of sprockets is twice the distance between corresponding points of the undulating path about the first set of sprockets. Furthermore, the transverse distance between the longitudinal axes of said undulating paths is one and a half times the distance between corresponding points on the undulating path about said first sprockets.

Positioned above the tray supporting platform substantially intermediate the extreme longitudinal positions thereof, is a pair of transversely spaced, doughnut forming and dropping devices, said spacing being equal to one quarter of the distance between corresponding points on said undulating path about said first set of sprockets. A mechanism is provided for periodically actuating the doughnut dropping devices for depositing a pair of doughnuts on a transported tray or screen, each time the tray engaging means crosses the longitudinal axis of the undulating path about said second set of sprockets, which axes are spaced a distance equal to the distance between corresponding axes in said first undulation path and one half said distance. It should be noted that the path distances between successive crossings of said axes are equal, whereas the longitudinal advances are zero or one half said distance and the transverse advances are either zero or equal to said distances. Thus, the doughnuts are deposited upon the conveyor tray in transverse rows of six each, the rows being longitudinally repeated in accordance with the number of sprockets in each set to provide a rectilinear pattern of deposited doughnuts. A switch is provided which is automatically tripped upon the sprocket chain completing a full run to stop the apparatus which has completed a cycle and fully loaded a tray.

Referring now to the drawings which illustrate a preferred embodiment of the present invention, the numeral 10 generally designates a table or base member provided with walls defining a housing having a door 11 by which access is provided to the interior of the base 10. Within the base 10 are housed a suitable electric drive motor, a compressor and a tank of compressed air, a gear reduction system and a motion translating system for producing reciprocating motions which are employed in motivating the various mechanisms of the subject machine, as will be hereinafter set forth.

A pair of longitudinal guide rails 12 of rectangular transverse cross section are disposed on the top of the base 10, extending for the width thereof, and are parallel to each other and transversely spaced being located adjacent the rear and forward sections of the base top. A plurality of regularly spaced rolls or wheels 13 are mounted on the outer vertical faces of the guide rails 12 by means of suitable horizontal pins 14. The wheels 13 are freely rotatable and have cylindrical peripheral surfaces, the upper portions of which extend above the tops of the guide rails 12 and the lower portions of which are raised above the level of the bottoms of said guide rails 12.

A longitudinal slide member 16 of a length substantially equal to that of the guide rails 12 slidably engages each of said guide rails. The slide member 16 is of channel shape, having a vertical cross arm 17 spaced from and confronting the corresponding wheels 13, a short lower horizontal leg disposed below the lower peripheries of the wheels 13 and extending substantially to the corresponding vertical face of the guide rail 12 and a long upper horizontal leg 20 extending over and beyond and above the level of the top face of the guide rail 12. A plurality of horizontally rotatable guide wheels 18 are supported on pins 19 depending from the free ends of the horizontal legs 20, the peripheries of the wheels 18 engaging and rotating along the confronting vertical inner faces of the corresponding guide rails 12.

A pair of longitudinally spaced transversely extending, horizontal guide rails 21 are rigidly supported upon two arms 20 to define with the slide members 16 a rectangular frame longitudinally slidable along the longitudinal guide rails 12 between positions overhanging the edges of the longitudinal guide rails 12, and being slidably removable from the guide rails 12.

The transverse guide rails 21 project forwardly in cantilever fashion beyond the front slide members 16 and are of transverse rectangular cross section. Furthermore, a plurality of regularly spaced vertically rotatable rollers or wheels 22 are mounted on the outer vertical faces of the transverse guide rails 21 by means of suitable horizontal pins extending from the transverse guide rails 21. The upper peripheral surfaces of the wheels 22 project above the upper level of the transverse guide rails 21 and the lower peripheral surfaces thereof are disposed above the lower level of said guide rails 21.

A tray support or platform 23 of rectangular shape is provided with upright flanges 24 along its rear and side edges. A pair of longitudinally spaced transversely extending channel shaped slide members 26 are mounted on and depend from the bottom face of the platform 23 and engage the wheels 22. The cross arms of the slide members 26 are vertically disposed, their inner faces confronting the wheels 22; the lower legs thereof are spaced just below the bottoms of the wheels 22 and the upper legs thereof ride upon the wheels 22. Furthermore, a plurality of transversely spaced horizontal wheels 27 are rotatably mounted upon pins depending from the under face of the platform 23 and engage the inner confronting faces of the guide rails 21. The platform 23 is transversely slidable along the guide rails 21 riding upon the wheels 22 as aforesaid to a point overhanging the front edges of the guide rails 21. Thus, the platform 23, as a result of the aforesaid supporting structure and when not engaged by the platform conveying mechanism, is movable or translatable in any horizontal direction while being maintained in a common horizontal plane by virtue of the fact that the platform may be moved while always parallel to itself and in a horizontal plane any increment regardless of size along mutually perpendicular directions and in any succession. Moreover, the platform 23 cannot rotate, retaining a constant orientation with its axes always parallel to the corresponding longitudinal and transverse guide rails 12 and 21. Wherever in the specification or claims reference is made to the universal motion or translation of the platform or other device, the aforesaid motion is meant and intended when the platform is not engaged by the conveying mechanism.

A pair of horizontally swingable inwardly extending arms 28 are mounted on transversely spaced pins 29 disposed adjacent the side edges of the platform 23, the pins 29 having part of its shank threaded and engaged by suitable nuts 30 for locking the arms 28 in any desired position. Mounted on and between the free ends of each pair of arms 28 is a tray spacing member 32 which is secured to the arms 28 by means of pins 33 whose spacing along the member 32 is equal to the distance between the pins 29. Thus, the spacing members 32 may be longitudinally adjusted while being maintained along a transverse direction since they can be moved only parallel to themselves. The inner confronting edges of the locating members 32 are provided with vertical flanges 34 to facilitate the proper positioning of a tray upon the platform 23. Furthermore, transverse bars 36 are dispersed on the platforms 23 in order to support the trays above the face of the platform. The tray 37, which is commonly employed, generally consists of a heavy wire rectangular frame 38 which supports between their longitudinal arms a plurality of spaced horizontal transverse wire grill strips 39, upon which it is desired to deposit the doughnuts or the like. The transverse positioning of the tray 37 is effected by means of the rear upright flange 24 of the platform 23. The tray 37 may be transported by the platform 23 so that any point thereof may be brought into registry with a predetermined point while maintaining the instant orientation of the tray. It should be noted that in the illustrated example the tray 37 is provided with eight transverse strips 39, each of which may be subdivided into six transversely successive sections 40. Thus, each tray may be subdivided into forty-eight adjacent square sections 40, arranged eight sections wide and six sections deep, and it is desired to deposit a doughnut or other article on each of the sections.

The mechanism for transporting or conveying the tray supporting platform 23 along a predetermined path is disposed below the platform 23 and mounted in the upper part of the housing defined by the base 10. Three longitudinally extending sprocket supporting plates 42, 43 and 44 are mounted upon a pair of spaced transverse channel members 46 disposed along the inside wide walls of the base 10. The plate 42 is wider than the plates 43 and 44 and is positioned adjacent the rear of the base 10, whereas the plate 44 is positioned adjacent the front of the base 10. The plate 43 is transversely slidably supported between the plates 42 and 44 and its relative position is adjusted by means of a pair of longitudinally spaced screw devices 47 engaging and positioned between the plates 42 and 43.

A plurality of horizontal sprockets 48, in the illustrated embodiment seven in number, are but for the middle one, rotatably mounted by means of suitable bearings upon corresponding vertical pins 49 and are regularly longitudinally spaced and transversely staggered, four of the sprockets 48 being offset toward the rear and the alternate three being forwardly offset. The middle sprocket 48 is mounted on and keyed to the upper part of a vertical shaft 50 which registers with a bearing 53 and is connected to the drive shaft of a suitable speed reduction unit 52 mounted in the bottom of the base 10 and driven by any suitable electric motor. The middle plate 43 rotatably supports by means of vertical pins 54 and suitable bearings three longitudinally aligned and spaced horizontal sprockets 56, each of which is transversely aligned with a corresponding one of the forwardly offset sprockets 48. Furthermore, the front plate 44 rotatably supports by means of vertical pins 57 and suitable bearings four longitudinally aligned and spaced horizontal sprockets 58, each of which is transversely algned with a corresponding one of the rearwardly offset sprockets 48. A pair of idler sprockets 59 are horizontally rotatably mounted adjacent the end of the plate 43 and in tangential alignment with the outer side peripheries of the end sprockets 48 and 58.

An endless roller chain 60 traverses an undulating path or run along and around sprockets 48 engaging the rear peripheries of the rearwardly offset sprockets 48 and the front peripheries of the forwardly offset sprockets 48. The roller chain 60 then extends from the outside peripheries of the end sprockets 58 and alternately about the sprockets 56 and 58. Thus, the longitudinal paths or runs of the roller chain 60 are each of uniform undulation, the amplitudes of these undulating runs being different and the end runs of the roller chain 60 being substantially linear. It should be noted that in the illustrated example that the spacing between the longitudinal axes X—X and Y—Y as seen in Figure 10 of the drawing of the undulating runs of the roller chain 60 is three-quarters times the distance along the undulating path of the roller chain 60, about the sprockets 48 for example, between any points L or between any points M as seen in Figure 10 of the drawing. It should be noted that corresponding points L, M or whatever points are selected are corresponding points only when they occupy similar positions at the same phase on the undulating path. Moreover, what is meant by the distance along the path between points is the distance one must travel along the undulating path per se to get from one point to the other. Furthermore, the distance between corresponding points along the undulating path of the roller chain 60 about the sprockets 56 and 58 for example, points P is twice the distance between corresponding points along the undulating path of the chain 60 about the sprockets 48. The longitudinal center to center distances between successive sprockets 48 and between longitudinally successive sprockets 56 and 58 are equal to one quarter the distance between corresponding points along the undulating path of the chain 60 about the sprockets 48.

The tray supporting platform 23 is provided substantially at its rear and mid portion with a depending collar 64 which engages an upright pin member 65, which is mounted on and transported by the roller chain 60. Thus, the tray supporting platform is conveyed along a path corresponding to the run of the roller chain 60, said path lying within an area no greater than that defined by the perimeter of a supported tray. An electric switch 66 is mounted adjacent the front of a sprocket 58 and is provided with a horizontally pivoted outwardly sprung actuating arm 67 having a roller 68 mounted at its free end. The switch 66 is connected in the machine drive motor circuit so as to open the motor circuit and de-energize the motor upon actuating of the switch 66, thereby stopping the machine. A suitable detent 69 is mounted on and extends laterally from the roller chain 60 and will engage the roller 68 to swing the arm 67 and actuate the switch 66 when brought in the vicinity thereof and so stop the machine.

An upper support member 70 is mounted in cantilever fashion above the top of the tray supporting platform 23 and is carried by an upright 71 disposed upon the rear of the base member 10. A dough hopper or reservoir 72 is positioned on the support member 70 and consists of a pressure tight vessel provided with a removable cover 73 which hermetically seals an opening in the hopper 72 through which the dough may be loaded into the hopper. The hopper 72 is connected by tubing to a suitable source of compressed air, not shown, which is preferably disposed in the housing defined by the base 10. Depending from and communicating with the interior of the hopper 72 is a pair of transversely spaced vertical circular conduits 74 having a center to center distance equal to the longitudinal center to center spacing of the sprockets 48 and the sprockets 56 and 58. The conduits 74 are disposed above the middle front portion of the base 10 and are provided with axial rods 76 which are supported by spiders 77 disposed at the upper openings of the conduits 74 and which have mounted at their lower end disc shaped valve elements 78 having a diameter substantially equal to the outer diameter of the conduits 74 and disposed below said conduits. Slidably engaging each of the conduits 74 is a tubular cutting member 79 having a tapered lower face terminating in a cutting edge 80 and a pair of upper vertically spaced peripheral flanges 81. The member 79 is movable between a position where the cutting edge 80 is below the valve element 78 and a position where the cutting edge is above said valve element to thereby permit the extrusion of dough outwardly through a cylindrical opening. The depression of the member results in the cutting of the dough into a toroidal or doughnut shape and the dropping thereof upon the platform supported tray.

The mechanism for periodically actuating the cutting member 79 includes a transverse shaft 82 suitably supported by way of bearing by brackets 83 hanging from the bottom of the support member 70. A crank member 84 is mounted on and adjacent to the rear of the shaft 82 and is freely rotatable thereon, being provided with an upper bore which engages the shaft 82 and a bore 86 disposed intermediate the ends of the crank member 84 and parallel to the shaft 82. Extending transversely from the lower end of the crank member 84 is a pin 87 which is engaged by the upper end of an adjustable link 88, the lower end of which is pin connected to an eccentric 89 which is driven through a suitable speed reduction unit 90 by the electric motor driving the chain sprockets. It should be noted that the speed reduction units 52 and 90 are so adjusted that the eccentric 89 makes one revolution as the chain 60 traverses a path equal to one half the distance between successive corresponding points along the run of the chain about the sprockets 48. A pair of depending bracket members 91 and 92 are keyed to the shaft 82 in similar angular positions, the bracket 91 being disposed immediately forward of the crank 86 and the bracket 92 intermediate the ends of the shaft 82. The bracket members 91 and 92 are provided with aligned transverse bushings 94 and 95 respectively being radially spaced from the shaft 82 a distance equal to the spacing between the bore 86 and said shaft. Slidably engaged by the bushings 94 and 95 is a control rod 96 which is movable between retracted and advanced positions where the end of the rod 96 respectively is completely out of the bore 86 or engages said bore. A compression spring 97 engaged between the bracket 95 and a collar 98 fixed to the rod 96 urges the rod to its advance bore engaging position. Furthermore, the rod 96 is provided with a suitable laterally extending pin or detent 99 which, when the rod is retracted and suitably twisted, bears against the forward face of the bushing 95 to retain the rod in its retracted position. The bushing is provided with a suitable slot 100 which permits the movement of the rod 98 to its forward position when the detent 99 is brought into registry with the slot 100. Thus, when the pin 99 registers with the slot 100, the rod 96 will be urged by the spring 97 into its forward position when the bore 86 is brought into alignment with the rod 96, thereby coupling and locking the rod 96, brackets 91 and 92, and crank 84, whereby the rocking of the crank 84 by the eccentric 89 through the link 88 imparts a rocking motion to the shaft 82. By retracting the rod 96, the motion of the shaft 82 is stopped.

Mounted and hinged to the shaft 82 and associated with each of the cutting members 79 is an arm 100'. Also mounted on the shaft 82 and rotatable thereon, are a pair of bell cranks 101, each of which has a vertical arm 102, which abuts the arm 100'. The arms 100' are provided with slots 103, through which passes lock screws 104 which engage corresponding tapped holes in the vertical arms 102. Furthermore, each arm 102 is provided with a laterally projecting pin 105, having a transversely tapped bore. A lug 106 depending from the arm 100' is also provided with a longitudinal bore in alignment with the aforesaid tapped bore. An adjusting screw 108 registers with the aligned bores engaging the tapped bore, and is provided with a collar 107 which confronts the lug 106. Thus, the relative angular positions between the bell crank 101 and the arm 100' may be adjusted by loosening the screws 104, manipulating the adjusting screw 108 and then tightening the lock screw 104. By so adjusting the relative positions of the bell crank 101 and arm 100', the time of the opening of the cutting member 79 by the valve element 78 may be adjusted thereby to control the amount of dough periodically extruded and formed into doughnuts. The horizontal arms 110 of the bell cranks 101 are bifurcated extending on both sides of each of the cutting members 79. A detent or pin element 111 projects inwardly of the bifurcated arms 110 and engages the groove between the horizontal flanges 81 of the cutting members 79. Thus, the rocking of the bell crank 101 results in the reciprocation of the cutting members 79 and the forming and dropping of a pair of doughnuts upon each rocking of the shaft 82.

Considering now the operation of the improved machine described above, the driven middle sprocket 48 is rotated in a counterclockwise direction, so that the chain traverses its run in a clockwise direction, as viewed in Figure 10 of the drawings, and the doughnuts are deposited in the sequence shown in Figure 9 of the drawings. The detent 69 is so disposed upon the roller chain 60 so as to trip the switch immediately following the dropping of a pair of doughnuts upon the lower two sections $a^1$ and $a^2$ of the right hand row of the tray 37 carried by the platform 23, at which point the platform is in substantially its leftmost rear position with said sections immediately below the cutting members 79 and the platform engaging pin 65 is on the longitudinal axis of the upper undulating run of the roller chain 60 at its leftmost portion. The loaded tray 37 is removed and replaced by an empty tray 37 and the machine started carrying the detent out of engagement with the switch arm 67 and permitting the operation of the machine for a full cycle until the switch is tripped after the platform has traversed a full closed path and the tray has been fully loaded with doughnuts occupying each section of the tray as illustrated in Figure 9 of the drawing. As the roller chain 60 traverses its upper undulating run, successive lower pairs of sections of the tray 37 are brought into registry with the cutting members 79, starting with sections $b^1$ and $b^2$ and continuing to sections $h^1$ and $h^2$. These pairs of sections are in registry with the cutting members 79 when the platform engaging pin 65 is positioned on the longitudinal axis of the said upper undulating run of the roller chain 60. Following the depositing of doughnuts on sections $h^1$ and $h^2$, the tray 37 traverses its lower undulating run where the sections occupying its upper or rear two thirds are brought into successively paired registry with the cutting members 79. Thus, successive pairs of sections $h^3$ and $h^4$, $h^5$ and $h^6$, $g^6$ and $g^5$, $g^4$ and $g^3$, $f^3$ and $f^4$, etc. are brought into registry with the cutting members 79 to $a^4$ and $a^3$ and thence to $a^2$ and $a^1$, where the loading cycle is completed and the machine stopped as a result of the detent 69 tripping the switch 66. It should be noted that the corresponding pairs of upper tray sections are in registry with the cutting members 79 when the platform engaging pin 65 is positioned on either of the longitudinal axes L and M of the lower undulating run, which axes are equidistant from the medial longitudinal axis of said run and are spaced from said axis a distance equal to the longitudinal center spacing of the sprockets 48, and 56 and 58. The aforesaid longitudinal axis L is equidistant between the longitudinal axis M and medial longitudinal axis of the upper undulating run. The rocking of the bell crank 101 and hence, the reciprocation of the cutting members 79, is so phased that a pair of doughnuts is dropped when the pin 65 crosses one of the aforesaid axes so as to deposit the doughnuts in each of the sections of the tray in a rectilinear pattern, as illustrated, of forty-eight, eight long and six deep.

While there has been described and illustrated a preferred embodiment of the present invention, it is obvious that numerous alterations and omissions may be made without departing from the spirit thereof.

We claim:

1. An apparatus of the character described, comprising a tray supporting platform, means for supporting said platform for universal translation in a horizontal plane while maintaining said platform in a constant orientation, means for moving said platform in said plane in a closed path having a plurality of connected transversely spaced uniformly undulating longitudinal runs, the distance along said path between corresponding points on one of said longitudinal runs being an integral multiple of the distance between corresponding points on the other of said longitudinal runs, and relatively stationary means for depositing articles upon said tray in accordance with the movement of said platform whereby said articles are deposited upon said tray in a predetermined pattern.

2. An apparatus of the character described, comprising a tray supporting platform, means for supporting said platform for universal translation in a horizontal plane while maintaining said platform in a constant orientation, means for moving said platform in said plane in a closed path having uniformly undulating longitudinal runs, the distance along said paths between corresponding points on one of said horizontal runs being an integral multiple of the distance between corresponding points on the other of said longitudinal runs, and the transverse spacing between the median longitudinal axes of said undulating runs being an odd multiple of one quarter the path distance between corresponding points on said other of said longitudinal runs, and relatively stationary means for depositing articles upon said tray in accordance with the movement of said platform whereby said articles are deposited upon said tray in a predetermined pattern.

3. An apparatus of the character described, comprising a tray supporting platform, means for supporting said platform for universal translation in a horizontal plane while maintaining said platform in a constant orientation, means for moving said platform in said plane in a closed path having uniformly undulating longitudinal runs, the distance along said paths between corresponding points on one of said horizontal runs being an integral multiple of the distance between corresponding points on the other of said longitudinal runs, the transverse spacing between the median longitudinal axes of said undulating runs being an odd multiple of one half the path distance between corresponding points on said other of said longitudinal runs, relatively stationary means for depositing articles upon said tray and means for actuating said depositing means as said platform traverses a distance along said path substantially equal to one half the path distance between corresponding points on said other of said longitudinal runs and in such phase where said articles are deposited upon said tray in a regular rectilinear pattern.

4. An apparatus as claimed in claim 3, wherein said article depositing means deposits upon said tray a plurality of transversely spaced articles upon each actuation thereof.

5. An apparatus as claimed in claim 3, wherein common drive means motivate said platform moving means and said article depositing means and means are provided for deactuating said drive means upon said platform, completely traversing said closed path.

6. An apparatus of the character described, comprising a tray supporting platform, means for supporting said platform for universal translation in a horizontal plane while maintaining said platform in a constant orientation, conveying means mechanically coupled to said platform for moving said platform in said plane in a closed path having a plurality of connected transversely spaced uniformly undulating longitudinal runs, the distance along said path between corresponding points on each of said longitudinal runs being an integral multiple of a common number, relatively stationary means for depositing articles upon said tray in accordance with the movement of said platform whereby said articles are deposited upon said tray in a predetermined pattern.

7. An apparatus of the character described comprising a tray-supporting platform, a first horizontal guide rail, a second horizontal guide rail perpendicular to and slideable along said first rail, said platform being slideably mounted along said second guide rail, conveying means mechanically coupled to said platform for moving said platform in a closed path in said horizontal plane, said platform being maintained in a substantially constant orientation, relatively stationary means for depositing articles upon said tray in accordance with the movement of said platform whereby said articles are deposited upon said tray in a predetermined manner, and means for interrupting the operation of said conveying and depositing means upon said tray completely transversing said predetermined path.

8. An apparatus in accordance with claim 7, wherein said conveying means is an endless conveyor having runs which lie in a common plane.

9. An apparatus of the character described comprising means for conveying a tray in a closed predetermined substantially planar path having transverse and longitudinal dimensions substantially equal to the corresponding longitudinal and transverse dimensions of said tray, means for depositing articles upon said tray, means for actuating said article-depositing means in synchronism with the linear movement of said tray whereby said articles are deposited upon said tray in a predetermined pattern, and means for automatically interrupting the operation of said conveying and depositing means upon said tray completely transversing said predetermined paths.

10. An apparatus in accordance with claim 9, including means for supporting and maintaining said tray in a common orientation while said tray is transported along said predetermined path.

11. An apparatus in accordance with claim 9, wherein said predetermined path is of tortuous configuration.

12. An apparatus in accordance with claim 9, wherein said platform-moving means includes an endless conveyor having runs which lie in a common plane.

13. An apparatus in accordance with claim 9, wherein said predetermined path includes a plurality of uniformly undulating longitudinal runs, the distance along said path between corresponding points on one of said longitudinal runs being an integral multiple of the distance between corresponding points on the other of said longitudinal runs.

14. An apparatus in accordance with claim 9, wherein said article-depositing means includes means for extruding, shaping, cutting and dropping individual masses of dough of uniform predetermined configuration.

References Cited in the file of this patent

UNITED STATES PATENTS

| | | |
|---|---|---|
| 393,665 | Ruby | Nov. 27, 1888 |
| 1,130,568 | Callow | Mar. 2, 1915 |
| 1,574,667 | Mackinzie | Feb. 13, 1926 |
| 1,939,400 | Lerche | Dec. 12, 1933 |
| 2,280,854 | Rooney | Apr. 28, 1942 |
| 2,471,214 | Hope | May 24, 1949 |
| 2,476,723 | Goldberg | July 19, 1949 |

FOREIGN PATENTS

| | | |
|---|---|---|
| 374,530 | Great Britain | June 2, 1932 |